US012610925B2

(12) United States Patent
Chen

(10) Patent No.: US 12,610,925 B2
(45) Date of Patent: Apr. 28, 2026

(54) BIRD FEEDER

(71) Applicant: Netvue Technologies Co., Ltd.,
Shenzhen (CN)

(72) Inventor: Chuan Chen, Shenzhen (CN)

(73) Assignee: Netvue Technologies Co., Ltd.,
Shenzhen (CN)

( * ) Notice: Subject to any disclaimer, the term of this
patent is extended or adjusted under 35
U.S.C. 154(b) by 0 days.

(21) Appl. No.: 19/218,411

(22) Filed: May 26, 2025

(65) Prior Publication Data

US 2025/0280801 A1 Sep. 11, 2025

Related U.S. Application Data

(63) Continuation of application No. 29/912,010, filed on
Sep. 12, 2023.

(30) Foreign Application Priority Data

May 23, 2023 (CN) ......................... 202330306306.X

(51) Int. Cl.
*A01K 39/012* (2006.01)
*A01K 29/00* (2006.01)
*A01K 39/02* (2006.01)
*G03B 29/00* (2021.01)

(52) U.S. Cl.
CPC ........ *A01K 39/0125* (2013.01); *A01K 29/005*
(2013.01); *A01K 39/0206* (2013.01); *G03B*
*29/00* (2013.01)

(58) Field of Classification Search
CPC .............. A01K 39/0125; A01K 29/005; A01K
39/0206; A01K 39/01
See application file for complete search history.

(56) References Cited

U.S. PATENT DOCUMENTS

| | | | | |
|---|---|---|---|---|
| 10,897,878 | B2 * | 1/2021 | Boehm ................. | A01K 31/14 |
| 11,944,072 | B1 * | 4/2024 | Lin ...................... | A01K 39/012 |
| 11,985,957 | B1 * | 5/2024 | Li ....................... | A01K 39/0113 |
| D1,058,950 | S * | 1/2025 | Jiang ........................... | D30/125 |
| D1,064,432 | S * | 2/2025 | Ding ........................... | D30/126 |

(Continued)

FOREIGN PATENT DOCUMENTS

CA 2876595 A1 * 7/2016 ............. A01K 39/00

*Primary Examiner* — Trinh T Nguyen

(57) ABSTRACT

A bird feeder includes a feeding component and a first
camera, where the feeding component is provided with a
feeding zone. The first camera is provided at or beyond an
edge of the feeding component and shoots from or beyond
the edge of the feeding component towards the feeding zone,
and captures first image data. The bird feeder designed in the
present application attracts birds to perch and feed via the
feeding component, while the first camera positioned at the
edge or outside the feeding component captures images or
videos of the bird feeding activities to address the difficulty
in bird observation and shooting, which enables the record-
ing of detailed feeding activities without disturbing the birds
which are feeding, thereby providing more stable and com-
prehensive documentation of bird feeding activities. This
facilitates observers' examination of bird feeding processes,
demonstrating significant potential for widespread adoption
and practical application value.

12 Claims, 5 Drawing Sheets

(56) References Cited

U.S. PATENT DOCUMENTS

| 2016/0156989 A1* | 6/2016 | Lovett | ................... | H04N 7/183 |
| | | | | 348/143 |
| 2016/0366319 A1* | 12/2016 | Perkins | ............. | H04N 1/00209 |
| 2017/0195551 A1* | 7/2017 | Klein | ..................... | H04N 7/188 |
| 2024/0334037 A1* | 10/2024 | Carter | ................... | A01K 31/10 |

* cited by examiner

BIRD FEEDER

CROSS-REFERENCE TO RELATED APPLICATION

The application is a continuation application of U.S. Design patent application Ser. No. 29/912,010, filed on Sep. 12, 2023, which claims priority to Chinese Design Patent Application No. 202330306306.X, filed on May 23, 2023. The disclosures of the above-mentioned applications are hereby incorporated by reference in their entireties.

TECHNICAL FIELD

The present application relates to the technical field of bird feeding, and in particular, to a bird feeder.

BACKGROUND ART

Currently, with the continuous advancement of shooting technology and growing public demand for observing natural environments, bird observation and shooting have gradually become a popular field.

However, birds are typically highly vigilant. When observers approach, the disturbance often causes birds to become alert and flee. This makes it extremely difficult to observe and shoot birds at close range spontaneously, preventing convenient and real-time bird observation, thus failing to meet people's needs for bird observation.

SUMMARY

The technical problem to be solved by the present application is to disclose a bird feeder that addresses the difficulty in bird observation and shooting.

In order to solve the aforementioned technical problem, the technical solution adopted by the present application is: a bird feeder including a feeding component and a first camera, where the feeding component is provided with a feeding zone. The first camera is provided at or beyond an edge of the feeding component and shoots from or beyond the edge of the feeding component towards the feeding zone, and captures first image data.

The present application addresses the technical problems in prior art where birds exhibit high vigilance during feeding, making it difficult for photographers to capture bird feeding activities and obtain detailed footage of bird feeding activities. In the aforementioned technical solution of the present application, the present application provides a novel bird feeder including a feeding component and a first camera. The bird feeder attracts birds to perch and feed via the feeding component, while the first camera positioned at the edge or outside the feeding component captures images or videos of the bird feeding activities, which enables the recording of detailed feeding activities without disturbing the birds which are feeding, thereby providing more stable and comprehensive documentation of bird feeding activities.

It should be noted that in the present application, the first camera is specifically provided at or outside the feeding component. That is, the camera may be positioned either along the periphery of the feeding component or at a location beyond its periphery, allowing it to effectively shoot the feeding zone on the component. This setup replaces manual shooting, autonomously capturing image data of bird feeding.

Further, for the bird feeder according to the present application, the feeding component includes a body and a feeding dish provided below the body and provided with the feeding zone.

Further, for the bird feeder according to the present application, the feeding zone is located at the edge of the feeding dish.

Further, for the bird feeder according to the present application, a flower-shaped bionic component is further connected to the feeding zone.

In the aforementioned technical solution of the present application, in order to attract birds to feed ahead, a flower-shaped bionic component is further connected to the feeding zone, so as to use the flower-shaped bionic component to simulate the state of flowers in nature, and to attract birds, such as hummingbirds fed with nectar to take food from the feeding port.

Further, for the bird feeder according to the present application, the edge of the feeding dish is provided with a perch at a position corresponding to the feeding zone.

In the aforementioned technical solution of the present application, the perch is provided so as to facilitate birds flying to the edge of the feeding dish and standing on the perch, thereby facilitating birds feeding directly from the feeding zone on the feeding dish.

Further, for the bird feeder according to the present application, the feeding dish is disc-shaped and the body is connected to the middle of the feeding dish.

In the aforementioned technical solution of the present application, the feeding dish is configured as a disc-shaped structure, which ensures enhanced structural stability of the entire bird feeder when birds stand on the perch for feeding, thereby minimizing sway amplitude.

Further, for the bird feeder according to the present application, the first camera is provided at or beyond the edge of the feeding dish and shoots from or beyond the edge of the feeding dish towards the feeding zone.

Further, for the bird feeder according to the present application, the bird feeder includes a mount; and one end of the mount is connected to the feeding dish, the other end of the mount extends to or beyond the edge of the feeding dish, and the first camera is provided at the other end of the mount.

Further, for the bird feeder according to the present application, the bird feeder is further provided with a second camera, the second camera being provided in the middle of the feeding dish, and the second camera shoots from the middle of the feeding dish towards the feeding zone and captures second image data.

In the aforementioned technical solution of the present application, to achieve superior shooting results in practice, a second camera may be additionally configured and controlled to simultaneously capture the feeding zone alongside the first camera. This dual-camera providement acquires both first image data and second image data, thereby obtaining bird feeding image data from multiple distinct perspectives.

Meanwhile, in practice, both the first camera and second camera may specifically employ high-definition network cameras to transmit real-time high-definition image data, facilitating observers' live bird observation experience. Additionally, observers may selectively switch viewing perspectives according to their preferences, toggling between the high-definition image data from either the first camera or second camera, enabling multi-angle observation of bird feeding activities.

Further, for the bird feeder according to the present application, the second camera is provided at the body so as to shoot the feeding zone.

Further, for the bird feeder according to the present application, a cover body is provided at the top of the body, and a groove is provided at the upper surface of the cover body.

In the aforementioned technical solution of the present application, the upper surface of the cover body is provided with a groove, and water is contained in the groove; when the bird feeder is suspended on a branch, when ants climb towards the body of the bird feeder in a vertical direction, the ants first crawl onto the cover body; at this time, since water is contained in the groove of the cover body, the ants and other insects can be blocked by using the water-proofing property of the ants and other insects, thereby preventing the ants and other insects from entering the interior of the bird feeder, and preventing the ants and other insects from entering the interior of the feeding component through the feeding port.

Further, for the bird feeder according to the present application, the cover body is provided with a first ring.

In the aforementioned technical solution of the present application, the aforementioned bird feeder can be suspended on a branch by means of a hook, and the first ring on the cover body can be buckled with a second ring on the hook to form a force-bearing rotating structure, and the structure thereof is simple; when a small animal such as a squirrel jumps towards the bird feeder of the present application, the whole bird feeder makes a pendulum motion with respect to a force-bearing point on the branch suspended by the hook, and meanwhile, the bird feeder rotates itself, so that the small animal such as a squirrel cannot grab and stabilize the bird feeder, and the service life of the bird feeder is improved.

Further, for the bird feeder according to the present application, the periphery of the first ring is convexly provided.

Further, for the bird feeder according to the present application, the bird feeder is further provided with a second camera, and the second camera is provided in the middle of the feeding component and shoots from the middle of the feeding component towards the feeding zone, and captures second image data.

Further, for the bird feeder according to the present application, the shooting direction of the first camera and the shooting direction of the second camera meet at the feeding zone.

The present application also discloses another technical solution: a bird feeder including a feeding component and a first camera, where the feeding component is provided with a feeding zone, the first camera is provided at or beyond an edge of the feeding component and shoots from or beyond the edge of the feeding component towards the feeding zone, and captures first image data; where the feeding component includes a body and a feeding dish provided below the body, the feeding dish is provided with the feeding zone, and the feeding dish is provided with a food storage cavity; and a feeding port is provided on the edge of the feeding dish, and the feeding port is in communication with the food storage cavity of the feeding dish.

Further, for the bird feeder according to the present application, the body is provided with a bird food chamber which communicates with the food storage cavity of the feeding dish, and the food in the bird food chamber is able to be delivered to the feeding dish.

Further, for the bird feeder according to the present application, inner walls of both the food storage cavity and the bird food chamber are of smooth structure.

In the aforementioned technical solution of the present application, in practice, it can also be specifically provided that the inner walls of the aforementioned food storage cavity and bird food chamber are both of smooth structure, which is free from protrusions or depressions, so as to facilitate subsequent cleaning.

The present application also discloses yet another technical solution: a bird feeder including a feeding component and a first camera, where the feeding component is provided with a feeding zone, the first camera is provided at or beyond an edge of the feeding component and shoots from or beyond the edge of the feeding component towards the feeding zone, and captures first image data; where the horizontal distance between a center point of lens of the first camera and the feeding zone is from 6 to 12 cm, and/or a vertical height difference between the center point of the lens of the first camera and an upper surface of the feeding zone is from 5 to 10 cm.

In the aforementioned technical solution of the present application, in order to obtain a more excellent shooting effect and ensure that the images captured by the camera can clearly show the feeding details of birds in the feeding zone, when the first camera is specifically mounted on the feeding dish, the position of the lens central point of the first camera can also be defined, for example: the horizontal distance between the central point of the lens of the aforementioned first camera and the feeding zone to be 6-12 cm is controlled, so as to avoid the first camera being too close to the feeding zone, preventing the capture range of the aforementioned first camera from being too small, and ensuring the image capture quality of the first camera.

For another example, in practice, it is also possible to control the vertical height difference of the lens central point of the first camera compared with the upper surface of the feeding dish to be 5-10 cm, so as to prevent the installation position of the first camera from being too high or too low, and prevent the subsequent occurrence: since the image capture angle of the first camera is not good, the observer cannot obtain a good image of bird feeding.

Further, for the bird feeder according to the present application, the bird feeder is further provided with a second camera, the second camera being provided in the middle of the feeding dish, and the second camera shoots from the middle of the feeding dish towards the feeding zone and captures second image data; the shooting direction of the first camera and the shooting direction of the second camera meet at the feeding zone.

Advantageous effects of the present application are that: the present application provides a new bird feeder including a feeding component and a first camera, which attracts birds to perch and feed via the feeding component, while the first camera positioned at a side of the feeding component captures images or videos of the bird feeding activities to address the difficulty in bird observation and shooting and can simply and conveniently achieve bird observation and shooting, and enables the recording of detailed feeding activities without disturbing the birds which are feeding, thereby providing more stable and comprehensive documentation of bird feeding activities. This facilitates observers' examination of bird feeding processes, demonstrating significant potential for widespread adoption and practical application value.

Figure 1:
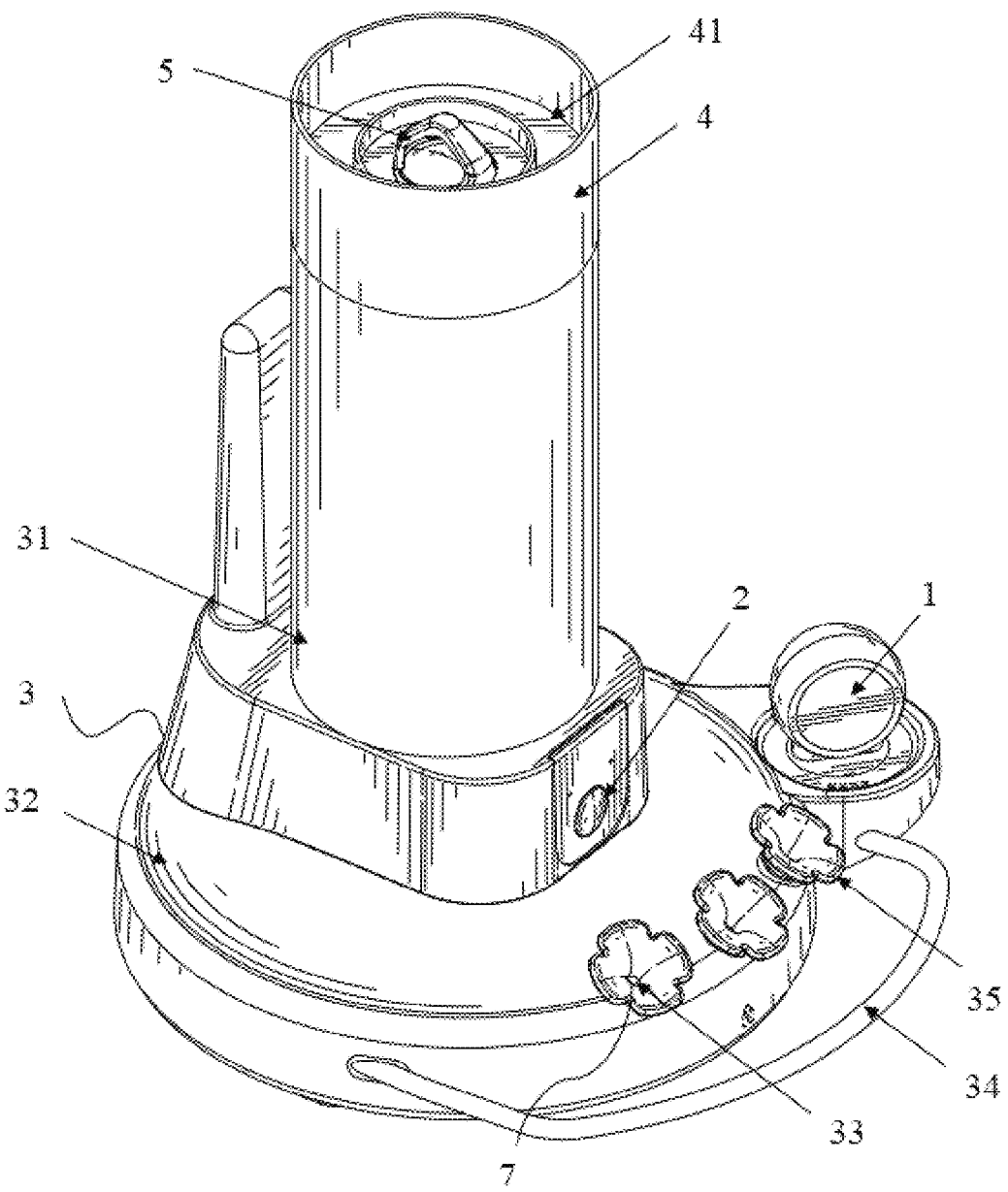
FIG. 1 is a schematic structural diagram showing a bird feeder according to the present application from another view in some embodiments.

DESCRIPTION OF REFERENCE NUMERALS 1. first camera;
2. second camera;
3. feeding component; 31. body; 32. feeding dish; 33. feeding port; 34. perch; 35. flower-shaped bionic component; 36. food storage cavity; 37. bird food chamber;
4. cover body; 41. groove;
5. first ring;
6. mount;
7. feeding zone.

DETAILED DESCRIPTION OF THE EMBODIMENTS

In order to explain the technical contents, the objects, and the effects of the present application in detail, the embodiments will be described below referring to the accompanying drawings.

In view of the high alertness of birds and the difficulty in capturing and observing birds in the prior art, the present application has devised a new bird feeder to facilitate observing and shooting birds.

Referring to FIGS. 1-5, in some embodiments, the bird feeder includes a feeding component 3 provided with a feeding zone 7 for bird feeding. The feeding component 3 is used to provide bird food for birds, attract the birds to stay, eat, and perform other activities.

Specifically, the feeding component 3 includes a body 31 and a feeding dish 32 provided below the body 31, the feeding dish 32 being provided with the feeding zone 7.

A feeding port 33 is provided on the edge of the feeding dish 32. The feeding ports 33 may be one or more in number and communicate with the feeding dish 32. The feeding port 33 is provided as the feeding zone 7. The edge of the feeding dish 32 is provided with a perch 34 for the birds to stand at a position corresponding to the feeding port 33. The birds can stand on the perch 34 and feed through the feeding port 33. Further, the feeding dish 32 has a disc-shaped structure, and the body 31 is connected to the middle portion of the feeding dish 32, so that the whole bird feeder is more stable and the swing amplitude is reduced when the bird eats standing. The aforementioned body 31 is specifically selected as a cylinder body, and the top of the cylinder body is further provided with a cover body 4. Specifically, the bird may be a hummingbird.

The feeding dish 32 can be separately provided with a food storage cavity 36 for storing bird food; alternatively, the body 31 may be provided with a bird food chamber 37 for storing bird food, the bird food chamber 37 being in communication with the feeding dish 32 or with a food storage cavity 36 of the feeding dish 32, so that the food in the bird food chamber 37 of the body 31 can be delivered into the feeding dish 32.

Figure 5:
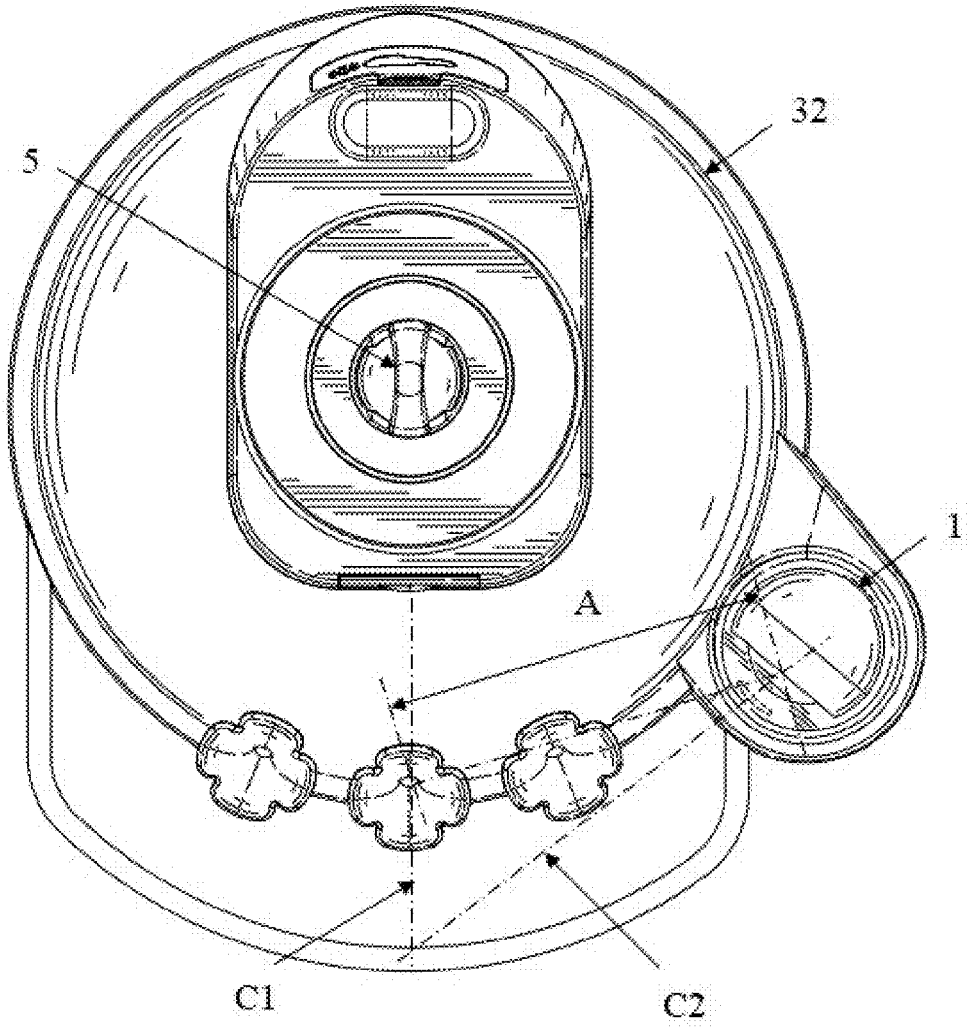
FIG. 5 is a top view of the bird feeder according to the present application in some embodiments.

In addition, in some embodiments, as can be seen with further reference to FIGS. 1 and 5, the top of the body 31 of the bird feeder is removably attached to the cover body 4. Alternatively, the body 31 is threadedly connected to the cover body 4 to facilitate manual quick disassembly for subsequent observers to change or add new food to the bird food chamber 37 of the body 31. In some embodiments of the present application, the feeding dish 32 and the inner wall of the body 31 are of smooth structures that are free of protrusions or depressions, so as to facilitate subsequent cleaning.

Figure 2:
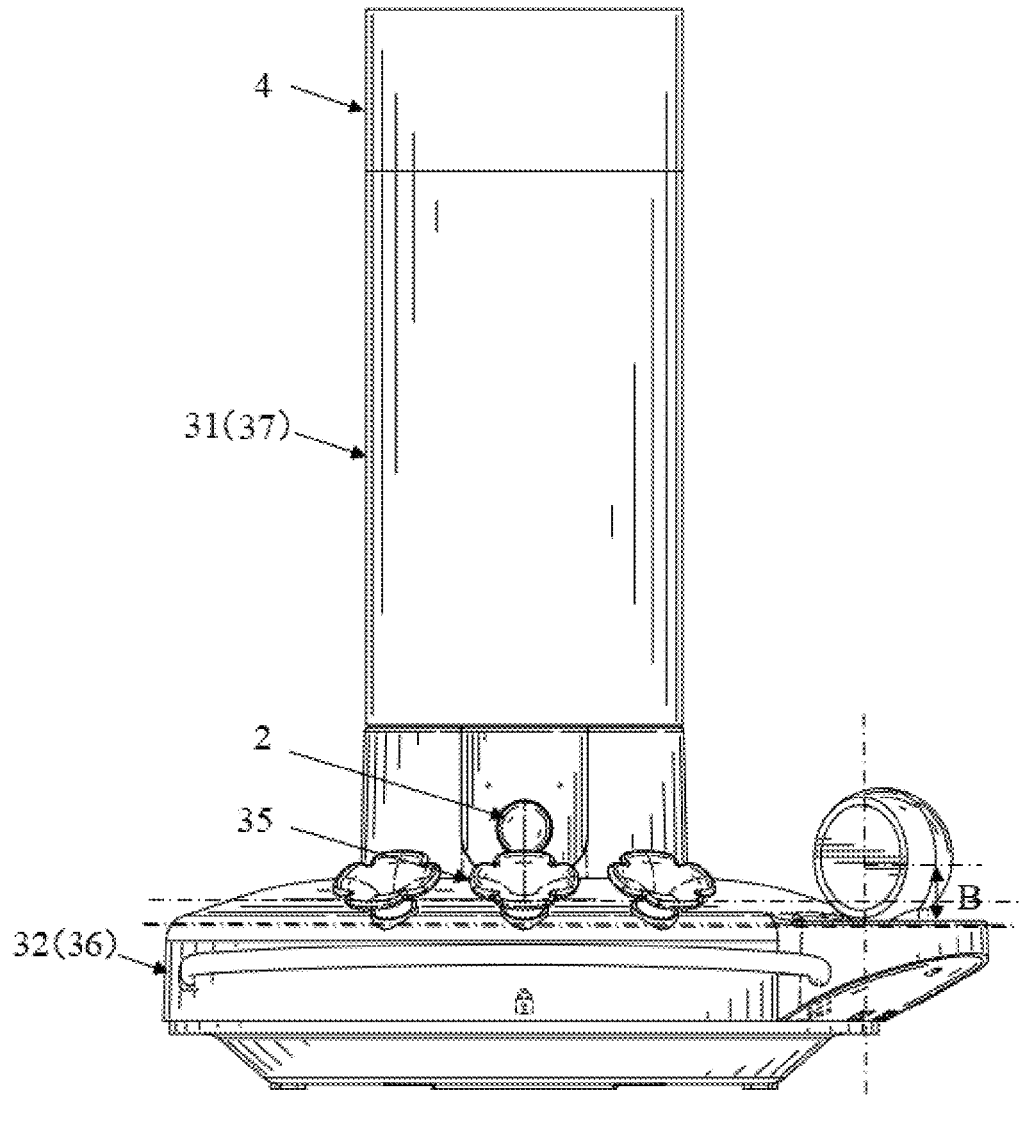
FIG. 2 is an elevational view of a bird feeder according to the present application in some embodiments.

In some embodiments, as shown in FIGS. 1 and 2, in order to conveniently observe and shoot birds in real time without disturbing the birds, the bird feeder is provided with a first camera 1, which is provided at or beyond the edge of the feeding component 3, shoots from or beyond the edge of the feeding component 3 towards the feeding zone 7, and captures first image data, so that the birds can be shot without disturbance when the birds are in the feeding zone 7. Specifically, the first camera 1 is provided at or beyond the edge of the feeding dish 32, and pictures are taken at or beyond the edge of the feeding dish 32 toward the feeding zone 7 of the feeding dish 32. The first camera 1 is not provided on the body 31 but provided at or beyond the edge of the feeding dish 32, and is provided in a side position of the feeding dish 32 or in a side position of the feeding zone 7, so that it is possible for an observer to shoot and observe birds by means of the first camera 1 without disturbing the birds.

Further, the bird feeder includes a mount 6. The mount 6 has one end connected to the feeding dish 32 and the other end extend to or beyond the edge of the feeding dish 32, and the first camera 1 is provided at the other end of the mount 6, i.e., the aforementioned first camera 1 is provided at or beyond the edge of the feeding dish 32, and first image data of the feeding zone 7 is captured by a lateral position.

Further, the bird feeder is further provided with a second camera 2, and the second camera 2 is provided in the middle of the feeding component 3 and shoots from the middle of the feeding component 3 towards the feeding zone 7, and captures second image data. Specifically, the second camera 2 is provided in the middle of the feeding dish 32, and shoots from the middle of the feeding dish 32 towards the feeding zone 7 of the feeding dish 32, and second image data of the feeding zone 7 is captured. The second camera 2 is provided in the middle of the feeding dish 32, and shoots in a manner of directly facing the feeding zone 7, so as to provide directly facing observation and shooting for the observers, and further greatly satisfy the observation requirements of the observers. Further, the second camera 2 is provided at the body 31 so as to shoot the feeding zone 7.

In order to obtain a better shooting effect, the shooting direction of the first camera 1 and the shooting direction of the second camera 2 meet at the feeding zone 7, i.e., C1 and C2 meet at the feeding zone 7 as shown in FIG. 5, so that birds in the feeding zone 7 can be shot at two different viewing angles in a lateral position and in a forward direction, respectively.

It should be noted that, in practice, both the aforementioned first camera 1 and the second camera 2 can be specifically selected as network cameras, so as to generate shooting data in real time to an observer, so as to facilitate the observer to observe birds in real time. Meanwhile, the observer can also choose to switch the viewing angles, i.e., to the first camera 1 or the second camera 2, according to his/her own preference, so as to observe the eating activity of a bird from different viewing angles.

Figure 3:
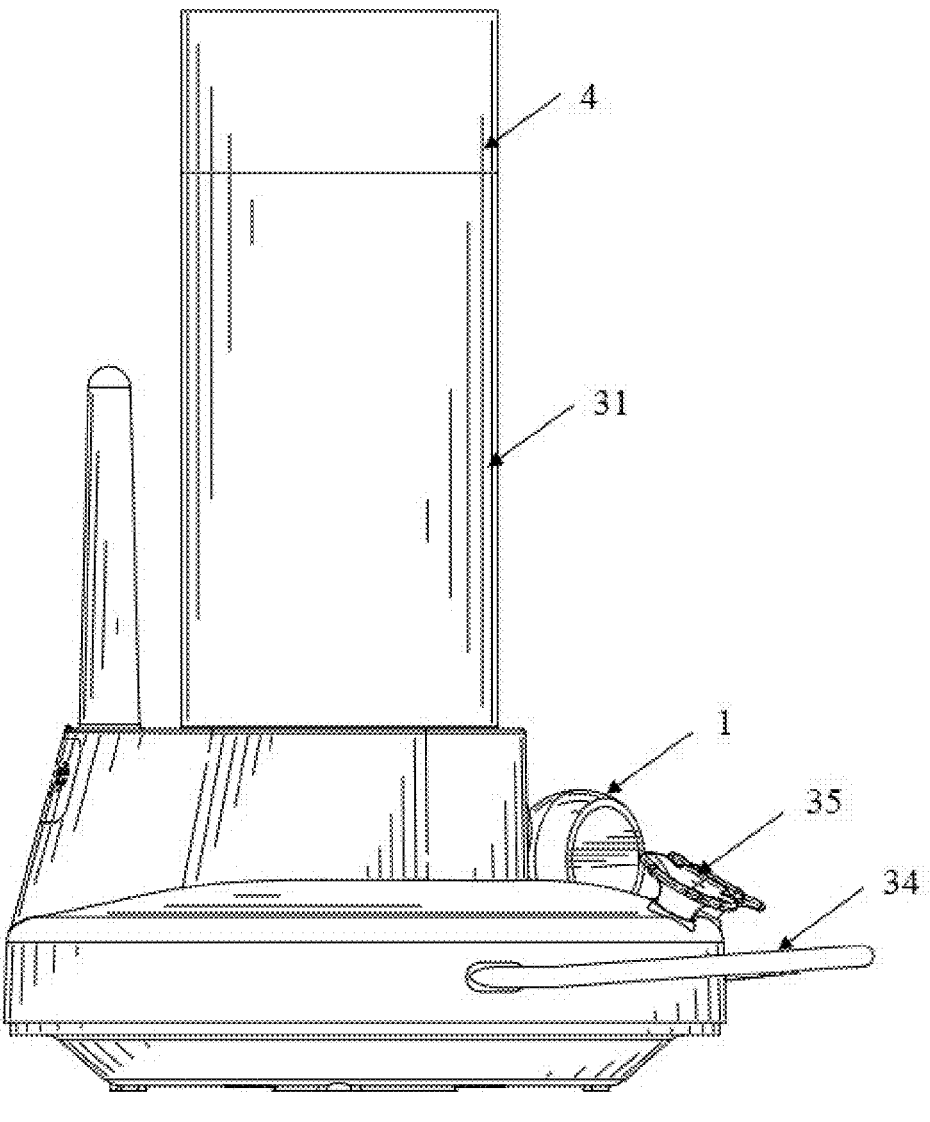
FIG. 3 is a left side elevational view of the bird feeder according to the present application in some embodiments.
Figure 4:
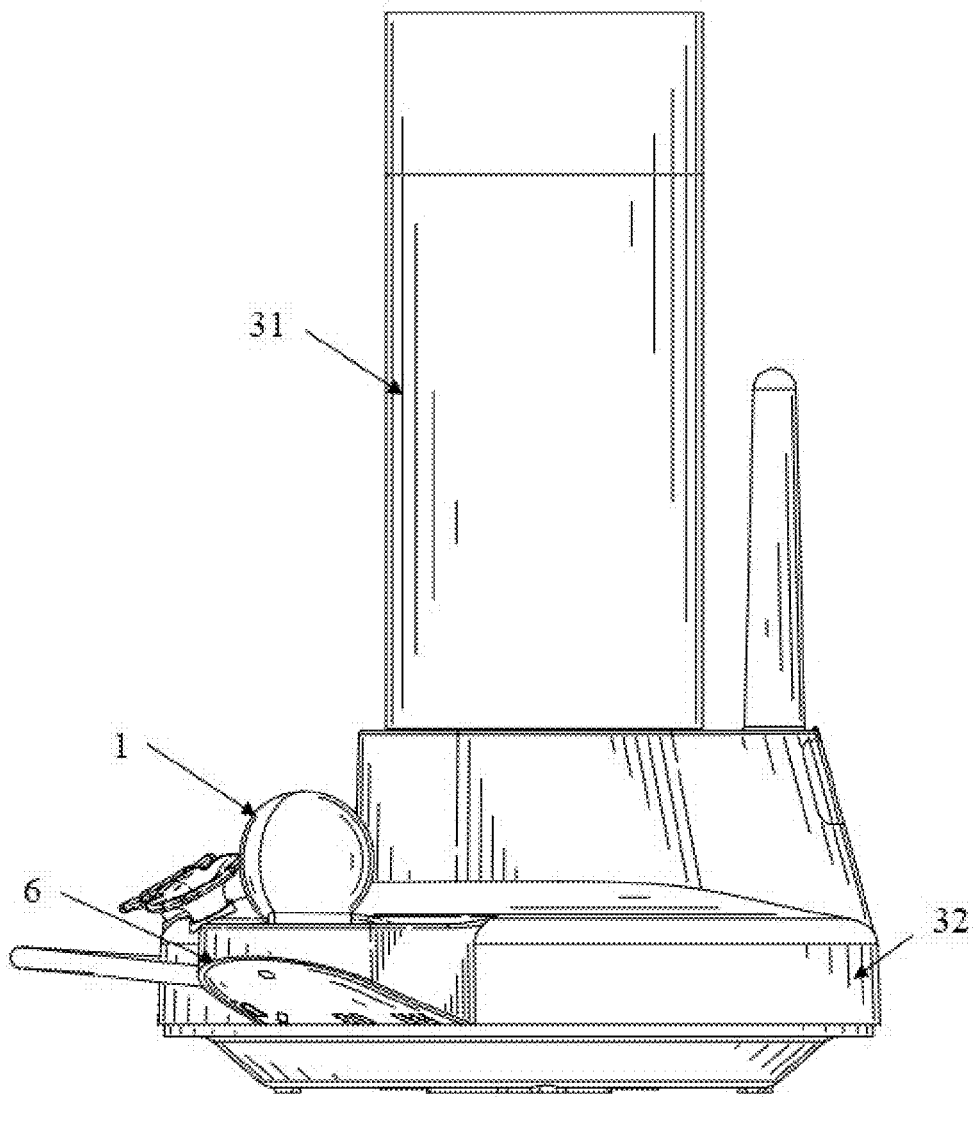
FIG. 4 is a right side elevational view of the bird feeder according to the present application in some embodiments.

Accordingly, in some embodiments, as shown in FIGS. 3, 4 and 5, in order to obtain a more excellent shooting effect and to ensure that the images captured by the cameras can clearly show the details of birds in the feeding zone 7, the horizontal distance between the lens central point of the first camera 1 and the feeding zone 7 is 6-12 cm, ensuring that the first camera 1 has a sufficiently large shooting distance and range. Further, a projection distance A of the lens central point of the first camera 1 and the at least one suction opening 33 on the horizontal plane can be 6-12 cm (see FIG. 5), so as to avoid that the first camera 1 is too close to the suction opening 33, to prevent the aforementioned capture range of the first camera 1 from being too small, and to ensure the image capture quality of the first camera 1.

Meanwhile, in some embodiments, a vertical height difference B between the lens central point of the first camera 1 and the upper surface of the feeding zone 7 is controlled to be 5-10 cm (see FIG. 2), so as to avoid the problem that the first camera 1 is installed in a too high or too low position, resulting in a poor view angle, and the observer cannot obtain a good image of the bird feeding.

In addition, it should be noted that, in practice, when an observer wants to shoot a particular bird, the observer can change the food that the particular bird prefers in order to attract the particular bird to eat. For a hummingbird, for example, sugar water or honey water is stored in the feeding component 3, and a flower-shaped bionic component 35 is further connected at the edge of the feeding port 33 of the bird feeder so as to simulate the state of a flower in the nature by using the flower-shaped bionic component 35 to attract a hummingbird or the like eating nectar to protrude its beak into the feeding port 33 to feed.

Additionally, in some embodiments of the present application as shown in FIG. 5, considering that various insects in nature may also be attracted to the food within the cavity, an anti-insect measure is implemented to prevent food contamination and competition from insects. In some embodiments, a groove 41 is provided on the upper surface of the cover body 4 with water hold in the groove 41 to prevent ants and other insects.

At this time, when the bird feeder is suspended on a branch, when ants climb towards the body 31 of the bird feeder in a vertical direction, the ants first crawl onto the cover body 4; at this time, since water is contained in the groove 41 of the cover body 4, the ants and other insects can be blocked by using the water-proofing property of the ants and other insects, thereby preventing the ants and other insects from entering the interior of the bird feeder, and preventing the ants and other insects from entering the interior of the feeding component 3 through the feeding port 33.

Accordingly, with reference to FIGS. 1 and 5, in some embodiments, in practice, the bird feeder can be suspended on a branch by means of a hook, and the cover body 4 thereof is provided with a first ring 5, and one end of the hook is provided with a second ring, so as to ensure that the second ring on the hook can be buckled with the first ring 5 on the cover body 4, thereby forming a stressed rotating structure; based on this structure, when a small animal such as a squirrel jumps towards the bird feeder of the present application, the whole bird feeder makes a pendulum motion with respect to a force-bearing point on the branch suspended by the hook, and meanwhile, the bird feeder rotates itself, so that the small animal such as a squirrel cannot grab and stabilize the bird feeder to protect the food in the bird feeder, and the service life of the bird feeder is improved.

Further, the circumferential protrusion of the first ring 5 forms an enclosure capable of holding water, and further blocks insects such as ants to form a double protection, so that the insects such as ants cannot enter the feeding component 3.

In view of the above, the bird feeder of the present application is capable of attracting birds to stay and feed through the feeding component 3 so as to take pictures or images of bird activities using the first camera 1 provided at the side of the feeding component 3, thereby observing and shooting birds without disturbing the birds, providing a more convenient and easier way of observing and shooting birds, and greatly satisfying the observer's viewing needs for birds.

Moreover, in the bird feeder designed by the present application, a second camera 2 is further provided to provide bird observation and shooting at a plurality of viewing angles, so as to facilitate an observer to better watch birds from a plurality of angles, and to select different viewing angles corresponding to the first camera 1/the second camera 2 to observe and shoot birds according to specific requirements.

Meanwhile, in order to improve the reliability of the bird feeder in use, in the present application, a flower-shaped bionic component 35 for attracting birds is further provided, a cover body 4 for blocking insects such as ants is provided, and a force-bearing rotating structure for preventing small animals from climbing is optimally designed, which enables the bird feeder designed in the present application to obtain a good application effect and a promotional value.

The above descriptions represent only some embodiments of the present application and shall not be construed as limiting the patent scope thereof. Any equivalent modifications made by applying the contents of this specification and accompanying drawings, whether directly or indirectly in related technical fields, shall equally fall within the patent protection scope of the present application.

What is claimed is:

1. A bird feeder, comprising a feeding component, a first camera and a second camera, wherein the feeding component comprises a body and a feeding dish provided below the body, the feeding dish is provided with a feeding zone, the feeding zone is located at an edge of a side of the feeding dish, the first camera is provided at or beyond the edge of the side of the feeding dish and is configured to shoot from or beyond the edge of the side of the feeding dish towards the feeding zone, and capture first image data;

the second camera is provided in a middle of the feeding dish and provided in the body, and is configured to shoot from the middle of the feeding dish towards the feeding zone and capture second image data; and a shooting direction of the first camera and a shooting direction of the second camera meet at the feeding zone.

2. The bird feeder according to claim 1, wherein a flower-shaped bionic component is further connected to the feeding zone.

3. The bird feeder according to claim 1, wherein the edge of the feeding dish is provided with a perch corresponding to a position of the feeding zone.

4. The bird feeder according to claim 1, wherein the feeding dish is disc-shaped and the body is connected to the middle of the feeding dish.

5. The bird feeder according to claim 1, comprising a mount; and one end of the mount is connected to the feeding dish, the other end of the mount extends to or beyond the edge of the feeding dish, and the first camera is provided at the other end of the mount.

6. The bird feeder according to claim 1, wherein the top of the body is provided with a cover body, and an upper surface of the cover body is provided with a groove.

7. The bird feeder according to claim 6, wherein the cover body is provided with a first ring.

8. The bird feeder according to claim 7, wherein a circumference of the first ring is convexly provided.

9. The bird feeder according to claim 1, wherein the feeding dish is provided with a food storage cavity; and a feeding port is provided on the edge of the side of the feeding dish, and the feeding port is in communication with the food storage cavity of the feeding dish.

10. The bird feeder according to claim 9, wherein the body is provided with a bird food chamber, the bird food chamber being in communication with the food storage cavity of the feeding dish, the food in the bird food chamber can be delivered into the food storage cavity.

11. The bird feeder according to claim 10, wherein inner walls of both the food storage cavity and the bird food chamber are of smooth structure.

12. The bird feeder according to claim 1, wherein a horizontal distance between a center point of lens of the first camera and the feeding zone is from 6 to 12 cm, and/or a vertical height difference between the center point of the lens of the first camera and an upper surface of the feeding zone is from 5 to 10 cm.

\* \* \* \* \*